United States Patent
Miyamae

(10) Patent No.: US 8,587,285 B2
(45) Date of Patent: Nov. 19, 2013

(54) POWER REGULATOR, CONTROL CIRCUIT, AND METHOD FOR CONTROLLING POWER REGULATOR

(75) Inventor: Toru Miyamae, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 349 days.

(21) Appl. No.: 13/038,106

(22) Filed: Mar. 1, 2011

(65) Prior Publication Data
US 2011/0273156 A1    Nov. 10, 2011

(30) Foreign Application Priority Data
May 7, 2010   (JP) ................................ 2010-107172

(51) Int. Cl.
*G05F 1/575*   (2006.01)

(52) U.S. Cl.
USPC .......................................................... 323/288

(58) Field of Classification Search
USPC ................................................ 323/288, 284
See application file for complete search history.

(56) References Cited

U.S. PATENT DOCUMENTS

| 7,595,624 B2 * | 9/2009 | Tateishi et al. ................ 323/288 |
| 2005/0286269 A1 | 12/2005 | Groom |

* cited by examiner

*Primary Examiner* — Harry Behm
(74) *Attorney, Agent, or Firm* — Arent Fox LLP

(57) ABSTRACT

A power regulator includes an output terminal, which outputs an output voltage, and a converter unit including a switch circuit, which is supplied with an input voltage, and a coil, which is coupled between the switch circuit and the output terminal. A control circuit compares a feedback voltage, which is in accordance with the output voltage, and a reference voltage and controls the switch circuit in response to a switching timing that is in accordance with the comparison result. The control circuit includes a voltage adding circuit, which adds a ramp voltage to the feedback voltage or the reference voltage, and a timing adjustment circuit, which is coupled to the voltage adding circuit to delay a timing for adding the ramp voltage with the voltage adding circuit from a switching timing of the switch circuit.

10 Claims, 4 Drawing Sheets

US 8,587,285 B2

POWER REGULATOR, CONTROL CIRCUIT, AND METHOD FOR CONTROLLING POWER REGULATOR

CROSS-REFERENCE TO RELATED APPLICATIONS

This application is based upon and claims the benefit of priority from prior Japanese Patent Application No. 2010-107172, filed on May 7, 2010, the entire contents of which are incorporated herein by reference.

FIELD

The embodiments discussed herein relate to a power regulator, a control circuit, and a method for controlling a power regulator.

BACKGROUND

A comparator type DC-DC converter is known as a power regulator. For example, a so-called step-down DC-DC converter, which generates an output voltage that is lower than its input voltage, includes a switch circuit, which is supplied with the input voltage, a coil, which is coupled to the switch circuit, and a smoothing capacitor, which is coupled between the coil and an output terminal. Current flows to the coil via the switch circuit when the input voltage is supplied. The smoothing capacitor smoothes the coil current to generate output voltage. The output voltage includes ripple voltage (ripple component) caused by the coil current and the equivalent series resistance (ESR) of the smoothing capacitor. Hence, a comparator compares the output voltage with a constant base voltage and, for example, activates the switch circuit when the output voltage becomes lower than the base voltage. Then, after a certain time elapses, the switch circuit is inactivated to control the output voltage of the DC-DC converter.

As described above, in a DC-DC converter that switches a switch circuit to generate output voltage, stabilized output voltage is favorable, that is, the output voltage having less ripple components is favorable. To meet this requirement, a DC-DC converter using a smoothing capacitor having a small equivalent series resistance has been discussed (for example, refer to US 2005/0286269). In such a DC-DC converter, the base voltage input to the comparator to control switching includes a ramp voltage portion, which is ramped at a given inclination.

The switch circuit functions under a switching duty that, for example, varies in accordance with changes in the load. For instance, when the load decreases, the inactive period is lengthened to lower the output current. Since the inclination of the ramp voltage portion in the base voltage is fixed, the voltage becomes high at the point of time in which the output voltage fed back to the comparator intersects the base voltage. This stabilizes the output voltage at a voltage that is higher than the desired target voltage. When the input voltage decreases, the output voltage stabilizes at a voltage that is lower than the desired target voltage. In this manner, the conventional DC-DC comparator is not applicable to a duty that varies in accordance with changes in the input voltage. This may have an adverse effect on line regulation.

SUMMARY

One aspect of the embodiments is a power regulator which includes an output terminal that outputs an output voltage. A converter unit includes a switch circuit, which is supplied with an input voltage, and a coil, which is coupled between the switch circuit and the output terminal. A control circuit compares a feedback voltage, which is in accordance with the output voltage, and a reference voltage and controls the switch circuit in response to a switching timing that is in accordance with the comparison result. The control circuit includes a voltage adding circuit that adds a ramp voltage to the feedback voltage or the reference voltage. A timing adjustment circuit is coupled to the voltage adding circuit to delay a timing for adding the ramp voltage with the voltage adding circuit from a switching timing of the switch circuit.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

DESCRIPTION OF EMBODIMENTS

First Embodiment

A power regulator, or DC-DC converter, according to a first embodiment will now be discussed with reference to FIGS. 1 to 5.

Figure 1:
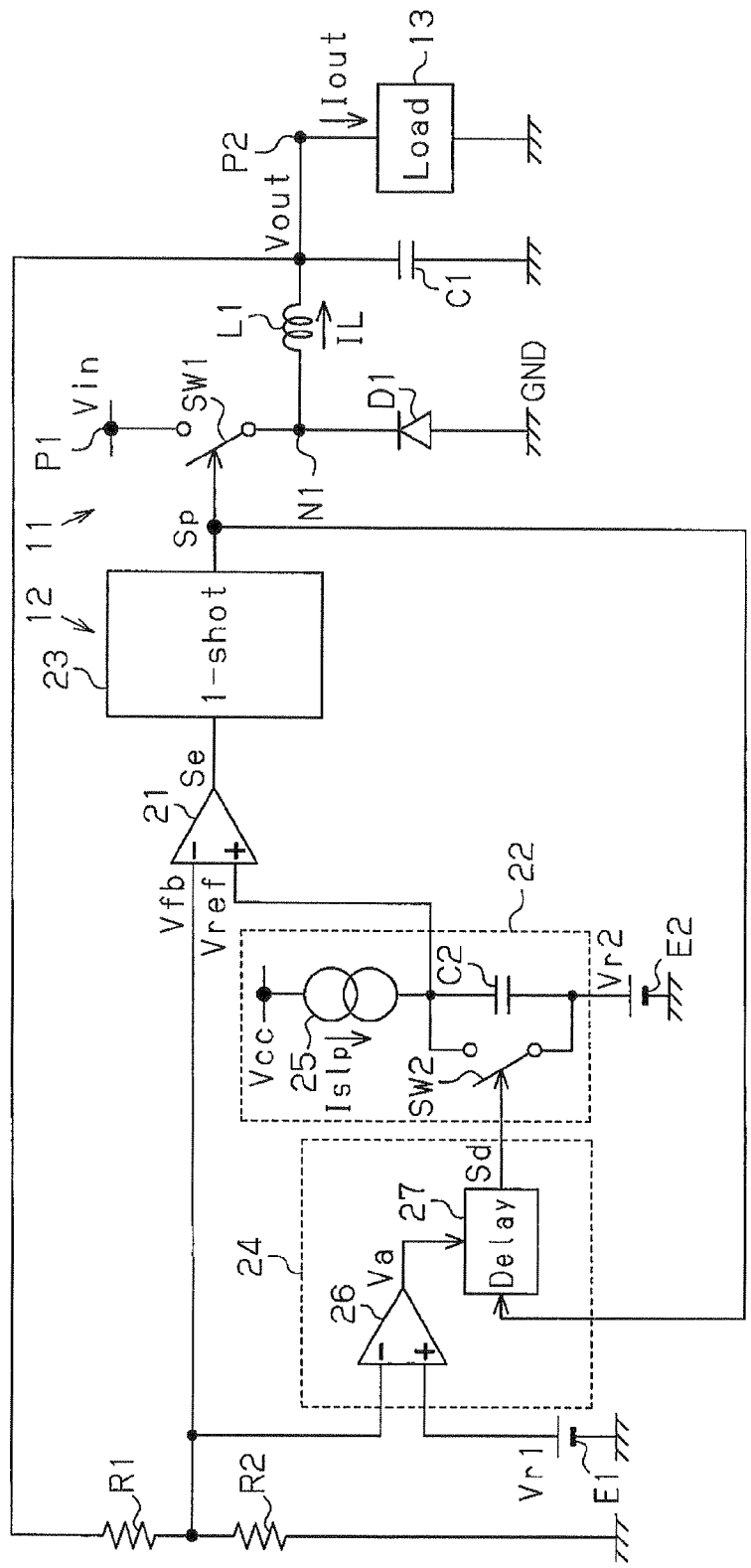
FIG. 1 is a block circuit diagram of a DC-DC embodiment according to a first embodiment.

Referring to FIG. 1, a DC-DC converter of the present embodiment includes a comparator unit 11, which receives an input voltage Vin and generates an output voltage Vout, and a control circuit 12, which controls the comparator unit 11.

The comparator unit 11 includes a switch circuit SW1, a diode D1, a coil L1, and a capacitor C1.

The switch circuit SW1 is, for example, an N-channel MOS transistor. The switch circuit SW1 is coupled between an input terminal P1, which is supplied with the input voltage Vin, and a first terminal (input terminal) of the coil L1. Further, the switch circuit SW is activated and inactivated in response to a drive signal Sp. For example, the switch circuit SW1 is activated when the drive signal Sp shifts to a high level and inactivated when the drive signal Sp shifts to a low level.

A node N1 between the switch circuit SW1 and the coil L1 is coupled to the cathode of the diode D1. The anode of the diode D1 is coupled to a power line having a low potential (in this case, ground).

The coil L1 has a second terminal (output terminal) coupled to an output terminal P2. Accordingly, the switch circuit SW1 and the coil L1 are coupled in series between the input terminal P1 and the output terminal P2. Further, the second terminal of the coil L1 is coupled to a first terminal of the smoothing capacitor C1, and a second terminal of the smoothing capacitor C1 is coupled to ground. The capacitor C1 is included in a smoothing circuit that smoothes the output voltage Vout.

When the switch circuit SW1 is active, coil IL flows through the coil L1 in accordance with the difference between the input voltage Vin and the output voltage Vout. This stores energy (power) in the coil L1. When the switch circuit SW1 is inactive, the energy stored in the coil L1 is released. Thus, induced current (current IL) flows through the coil L1.

The output terminal P2 may be coupled to a load 13. The DC-DC converter supplies the load 13 with the output voltage Vout and output current Iout. The capacitor C1 averages the coil current IL to obtain the output current Iout.

The load 13 is, for example, an internal circuit (ASIC, memory, CPU, liquid crystal display, or the like) of an electronic device. When the operational state of an internal circuit changes or the number of circuits operated by the supplied power changes, that is, when the state of the load 13 changes, the amount of current required for the load 13, that is, the load current, changes. When the load 13 applies a light load, the output voltage Vout may increase. When the load 13 applies a heavy load, the output voltage Vout may decrease. Thus, the control circuit 12 adjusts the duty (ratio of the high level period relative to the low level period) of the drive signal Sp in accordance with the output voltage Vout and the output current Iout. The duty may also be the ratio of the active period relative to the switching cycle.

The control circuit 12 includes a comparator 21, a reference voltage generation circuit 22, a one-shot multi-vibrator (hereafter referred to as the one-shot circuit) 23, a timing adjustment circuit 24, a base power supply E1, and resistors R1 and R2.

The comparator 21 has an inverting input terminal supplied with a feedback voltage Vfb, which corresponds to the output voltage Vout. In the present embodiment, the resistors R1 and R2 generate the feedback voltage Vfb from the output voltage Vout, which is supplied to the inverting input terminal of the comparator 21. For example, the resistor R1 has a first terminal coupled to the output terminal P2. The output voltage Vout is fed back to the first terminal of the resistor R1 from the output terminal P2. Further, the resistor R1 has a second terminal coupled to a first terminal of the resistor R2. The resistor R2 has a second terminal coupled to ground. A node between the resistors R1 and R2 is coupled to the inverting input terminal of the comparator 21. The resistors R1 and R2, in accordance with their resistances, divide the output voltage Vout to generate the feedback voltage Vfb. The value of the feedback voltage Vfb is in accordance with the ratio of the resistances of the resistors R1 and R2 and the potential difference of the output voltage Vout and ground. In this manner, the resistors R1 and R2 generate the feedback voltage Vfb that is proportional to the output voltage Vout.

The comparator 21 has a non-inverting terminal supplied with a reference voltage Vref, which is generated by the reference voltage generation circuit 22.

The reference voltage generation circuit 22 includes a switch circuit SW2, a capacitor C2, a constant current source 25, and a reference power supply E2. The constant current source 25 has a first terminal coupled to a power line for a high potential voltage Vcc. Further, the constant current source 25 has a second terminal coupled to a first terminal of the capacitor C2. The capacitor C2 has a second terminal coupled to the positive terminal of the reference power supply E2. The negative terminal of the reference power supply E2 is coupled to ground GND. The capacitor C2 is coupled in parallel to the switch circuit SW2. The switch circuit SW2 is activated and inactivated in response to a control signal Sd. The switch circuit SW2 is, for example, an N-channel MOS transistor.

When the switch circuit SW2 is active, the switch circuit SW2 short circuits the two terminals of the capacitor C2, and the potential at the first terminal of the capacitor C2 becomes equal to a base voltage Vr2 of the reference power supply E2.

When the switch circuit SW2 is inactive, the switch circuit SW2 opens the two terminals of the capacitor C2, and the potential difference between the two terminals of the capacitor C2 starts increasing in accordance with current Islp, which is supplied from the constant current source 25. The rate of change in the potential difference is proportional to the current Islp. The potential at the second terminal of the capacitor C2 defines the base voltage Vr2 of the reference power supply E2. Accordingly, the potential at the first terminal of the capacitor C2 is obtained by superimposing the potential difference between the first and second terminals of the capacitor C2 on the base voltage Vr2. The potential at the first terminal of the capacitor C2 is supplied as the reference voltage Vref to the comparator 21.

Accordingly, during the period in which the switch circuit SW2 is active, the reference voltage Vref defines a constant first voltage (base voltage Vr2). When the switch circuit SW2 is inactivated, the reference voltage Vref commences to increase from the first voltage. The reference voltage Vref increases at a constant rate. That is, the reference voltage Vref increases at a given inclination. Accordingly, the reference voltage Vref includes a constant voltage portion, which corresponds to the activation of the switch circuit SW2, and an increasing voltage portion or ramp voltage portion, which corresponds to the inactivation of the switch circuit SW2. The reference voltage Vref is generated by adding a ramp voltage, which increases at a given inclination, to the base voltage Vr2. In the illustrated example, the ramp voltage is the charged voltage stored in the capacitor C2. The switch circuit SW2 and the capacitor C2 is one example of a voltage addition circuit that adds the ramp voltage to the base voltage Vr2.

The comparator 21 compares the feedback voltage Vfb and the reference voltage Vref to generate a comparison result signal Se. In the present embodiment, the comparator 21 generates the comparison result signal Se at a low level when the feedback voltage Vfb is higher than the reference voltage Vref. Further, the comparator 21 generates the comparison result signal Se at a high level when the feedback voltage Vfb is lower than the reference voltage Vref. The comparison result signal Se is provided to the one-shot circuit 23.

Figure 3A:
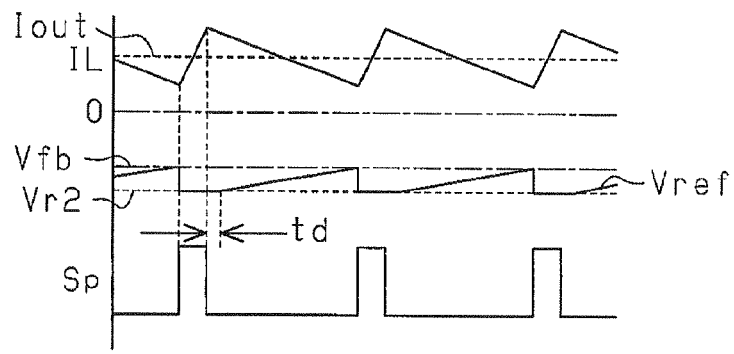
FIGS. 3(a) and 3(b) are waveform diagrams illustrating the operation of the DC-DC converter.

The one-shot circuit 23 outputs the drive signal Sp at a high level when the comparison result signal Se has a high level, continues to output the high level drive signal Sp for a fixed period, and outputs the drive signal Sp at a low level after the fixed period elapses (refer to FIG. 3(a)). As described above, the comparator 21 outputs the comparison signal Se at a high level when the reference voltage Vref becomes higher than the feedback voltage Vfb. For example, the comparator 21 shifts the comparison result signal Se to a high level at the point of time when the feedback voltage Vfb intersects the reference voltage Vref. Accordingly, the one-shot circuit 23 outputs the drive signal Sp at a high level for a fixed period from when the feedback voltage Vfb intersects the reference voltage Vref.

The drive signal Sp is provided to the switch SW1 of the converter unit 11 and to the timing adjustment circuit 24 of the control circuit 12.

The timing adjustment circuit 24 includes an operational amplifier 26 and a delay circuit 27.

The operational amplifier 26 has an inverting input terminal, which receives the feedback voltage Vfb, and a non-inverting input terminal, which receives the base voltage Vr1 of the base power supply E1. The base voltage Vr1 is set in accordance with the output voltage Vout. The operational amplifier 26 outputs a voltage Va, which is in accordance with the difference of the feedback voltage Vfb and the base voltage Vr1. In detail, the operational amplifier 26 amplifies the voltage difference of the feedback voltage Vfb and base voltage Vr1 to output the voltage Va. In one embodiment, the voltage Va is in inverse proportion to the feedback voltage Vfb. The voltage Va may be referred to as the output signal Va of the operational amplifier 26.

The delay circuit 27 receives the drive signal Sp and the voltage Va. The delay circuit 27 outputs the control signal Sd in accordance with the drive signal Sp and adjusts the timing for outputting the control signal Sd at a low level in accordance with the voltage Va. In detail, the delay circuit 27 outputs the control signal Sd at a high level when the drive signal Sp has a high level. When the delay circuit 27 receives the drive signal Sp at a low level, the delay circuit 27 outputs the control signal Sd at a low level after a given delay time, which is in accordance with the voltage Va, elapses from when the drive signal Sp is received. Accordingly, the delay circuit 27 delays the falling timing of the control signal Sd from the falling timing of the drive signal Sp. In particular, the delay circuit 27 adjusts the falling timing of the control signal Sd in accordance with the output voltage Vout.

The timing adjustment circuit 24 provides the control signal Sd to the switch circuit SW2 of the reference voltage generation circuit 22. As described above, the switch circuit SW2 is activated when the control signal Sd shifts to a high level and inactivated when the control signal Sd shifts to a low level. The reference voltage Vref is a constant voltage (Vr2) when the control signal Sd has a high level and increases at a given inclination when the control signal Sd has a low level. Accordingly, the timing adjustment circuit 24 adjusts the point of time for commencing the increasing of the reference voltage Vref, that is, the timing for adding a ramp to the base voltage Vr2.

Figure 2:
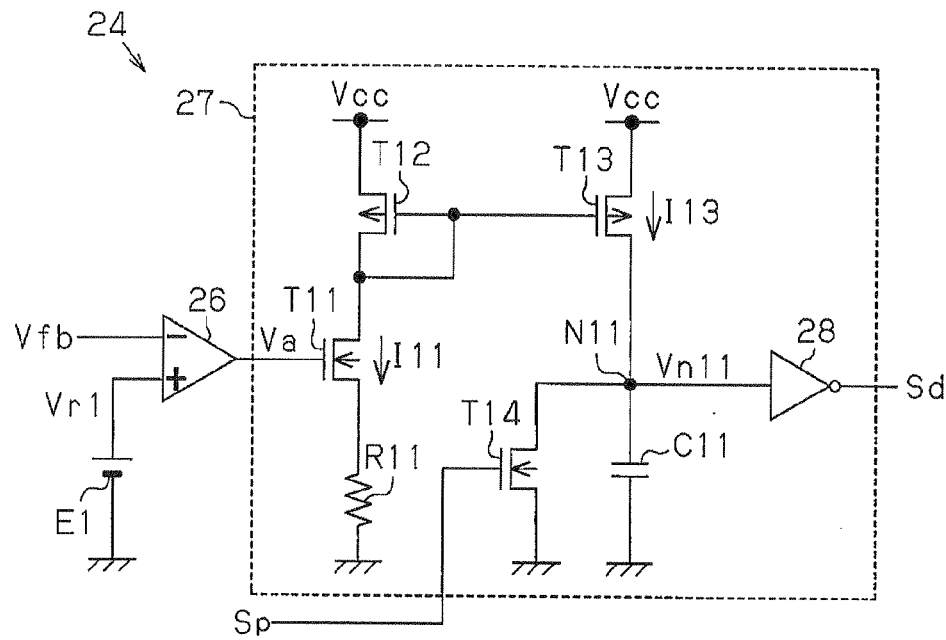
FIG. 2 is a circuit diagram of a timing adjustment circuit.

As illustrated in FIG. 2, the delay circuit 27 includes an inverter 28, a capacitor C11, a resistor R11, and transistors T11 to T14.

The voltage Va that is output from the operational amplifier 26 is supplied to the gate of the N-channel MOS transistor T11. The source of the transistor T11 is coupled to the first terminal of the resistor R11, and the second terminal of the resistor R11 is coupled to ground GND. The drain of the transistor T11 is coupled to the drain of the P-channel MOS transistor T12. Current I11, which is proportional to the voltage Va that is supplied to the gate of the transistor T11, flows through the transistor T11.

The source of the transistor T12 is supplied with the high potential voltage Vcc. The high potential voltage Vcc may be the input voltage Vin or a voltage generated by a power supply circuit (not illustrated). The gate of the transistor T12 is coupled to the drain of the transistor T12 and the gate of the P-channel MOS transistor T13. Accordingly, the transistor T12 and the transistor T13 form a current mirror circuit. The current mirror circuit generates current I13 that flows through the transistor T13. The current I13 is proportional to the current I11, which flows through the transistor T11.

The drain of the transistor T13 is coupled to a first terminal of the capacitor C11 and the drain of the N-channel MOS transistor T14. A second terminal of the capacitor C11 and the source of the transistor T14 are coupled to ground. In this manner, the transistor T14 is coupled in parallel to the capacitor C11. The capacitor C11 is supplied with current I13, which is dependent on the feedback voltage Vfb (or output voltage Vout), from the transistor T13. The transistor T14 includes a switch circuit that switches charging and discharging of the capacitor C11 in the timing adjustment circuit 24.

The gate of the transistor T14 is provided with the drive signal Sp from the one-shot circuit 23. The transistor T14 is inactivated when the drive signal Sp shifts to a high level and activated when the drive signal Sp shifts to a low level. When the transistor T14 is active, the two terminals of the capacitor C11 are coupled to each other. Thus, a voltage Vn11 at the first terminal (node N11) of the capacitor C11 has a ground level. When the transistor T14 is activated, the current I13 from the transistor T13 charges the capacitor C11. Thus, the voltage Vn11 at the node N11 commences to increase from ground level.

The node N11 is coupled to the input terminal of the inverter 28. The inverter 28 outputs the control signal Sd, which has a level obtained by logically inverting the level of the voltage Vn11 at the node N11. For example, the inverter 28 outputs the controls signal Sd at a high level when the voltage Vn11 is lower than the threshold voltage of the inverter 28, and outputs the controls signal Sd at a low level when the voltage Vn11 is higher than the threshold voltage. When the drive signal Sp shifts to a low level, the transistor T14 is inactivated. This starts charging the capacitor C11, and the voltage Vn11 at the node N11 commences to increase. When the voltage Vn11 exceeds the threshold voltage of the inverter 28, the inverter 28 outputs the control signal Sd at a low level. When the drive signal Sp shifts to a high level, the transistor T14 is activated, and the voltage Vn11 at the node N11 shifts to ground level, which is lower than the threshold voltage. Thus, the inverter 28 outputs the control signal Sd at a high level.

In this manner, the delay circuit 27 outputs the control signal Sd at a high level when the drive signal Sp shifts to a high level. When the delay circuit 27 receives the drive signal Sp at a low level, the delay circuit 27 delays the output of the control signal Sd, which has a low level, from the falling timing of the drive signal Sp by a time period that is in accordance with the charged state of the capacitor C11. Here, td represents the delay time of the falling of the control signal Sd from the rising of the drive signal Sp.

The voltage Vn11 at the node N11 increases in accordance with the current amount of the current I13 supplied to the capacitor C11. That is, the increased amount of the voltage Vn11 is proportional to the amount of the current I13. The amount of the current I13 supplied from the transistor T13 to the capacitor C11 is proportional to the amount of the current I11 that flows to the transistor T11. Further, the amount of the current I11 flowing to the transistor T11 is proportional to the voltage Va supplied to the gate of the transistor T11, that is, the feedback voltage Vfb (output voltage Vout).

For example, when the feedback voltage Vfb increases, the amount of the current I11 flowing to the transistor T11 increases. As a result, the voltage Vn11 at the node N11 increase quickly, and the time period from when the drive signal Sp falls to when the voltage Vn11 exceeds the threshold voltage of the inverter 28 is shortened. Thus, the delay time td is shortened. On the other hand, when the feedback voltage Vfb decreases, the amount of the current I11 flowing to the transistor T11 decreases. As a result, the voltage Vn11 at the node N11 increases gradually, and the time period from when the drive signal Sp falls to when the voltage Vn11 exceeds the threshold voltage of the inverter 28 is lengthened. Thus, the delay time td is lengthened.

As described above, the drive signal Sp provided to the timing adjustment circuit 24 is also provided to the switch circuit SW1 of the converter unit 11 illustrated in FIG. 1. The switch circuit SW1 is activated when the drive signal Sp shifts to a high level and is inactivated when the drive signal Sp shifts to a low level. That is, the timing adjustment circuit 24 delays the timing for commencing the increasing of the reference voltage Vref (adding timing) from when the switch circuit SW1 is inactivated.

The operation of the DC-DC converter will now be discussed.

The comparator 21 of the control circuit 12 illustrated in FIG. 1 outputs the comparison result signal Se at a high level when the reference voltage Vref becomes higher than the feedback voltage Vfb. In response to the high comparison result signal Se, the one-shot circuit 23 outputs the drive signal Sp at a high level for a fixed period. The drive signal Sp activates the switch circuit SW1. That is, the switch circuit SW1 is activated at the intersecting point of the waveform of the feedback voltage Vfb and the waveform of the reference voltage Vref. The time period from inactivation of the switch circuit SW1 to the intersecting point defines an inactive period. The inactive period includes the delay time td.

An increase in the output voltage Vout, or the feedback voltage Vfb, increases the reference voltage Vref that conforms to the feedback voltage Vfb. That is, the time period from when the reference voltage Vref commences to increase to when the reference voltage Vref and feedback voltage Vfb intersect is lengthened. Further, an increase in the output voltage Vout causes the timing adjustment circuit 24 to lengthen the delay time td. This lengthens the inactive period, and the active period of the switch circuit SW1 is fixed. Thus, the on duty for the switching is decreased. As a result, the output voltage Vout decreases.

On the other hand, a decrease in the output voltage Vout, or the feedback voltage Vfb, decreases the reference voltage Vref that conforms to the feedback voltage Vfb. That is, the time period from when the reference voltage Vref commences to increase to when the reference voltage Vref and feedback voltage Vfb intersect is shortened. Further, a decrease in the output voltage Vout causes the timing adjustment circuit 24 to shorten the delay time td. This shortens the inactive period, and the active period of the switch circuit SW1 is fixed. Thus, the on duty for the switching is increased. As a result, the output voltage Vout increases.

As described above, the timing adjustment circuit 24 compares the feedback voltage Vfb and the base voltage Vr1 to adjust the delay time td in accordance with the comparison result. When the feedback voltage Vfb is higher than the base voltage Vr1, the timing adjustment circuit 24 lengthens the delay time td. When the feedback voltage Vfb is lower than the base voltage Vr1, the timing adjustment circuit 24 lengthens the delay time td. When the delay time td is lengthened, the on duty decreases, and the output voltage Vout decreases. In contrast, when the feedback voltage Vfb is lower than the base voltage Vr1, the on duty increases, and the output voltage Vout increases. Accordingly, the timing adjustment circuit 24 adjusts the delay time td so that the feedback voltage Vfb conforms to the base voltage Vr1.

When the feedback voltage Vfb conforms to the base voltage Vr1 and is stable, in each switching cycle, the time period from when the reference voltage Vref commences to increase to when the reference voltage Vref and the feedback voltage Vfb intersect does not vary and thus stabilizes. As a result, the voltage difference of the reference voltage Vref when it conforms to the feedback voltage Vfb and the voltage when the reference voltage Vref commences to increase, or base voltage Vr2, does not vary and thus stabilizes. The voltage difference is equal to the difference of the first base voltage Vr1 and the second base voltage Vr2. Accordingly, the second base voltage Vr2 is set in accordance with the minimum voltage difference required for forming a ramp voltage portion in the reference voltage Vref with the first base voltage Vr1.

Figure 3B:
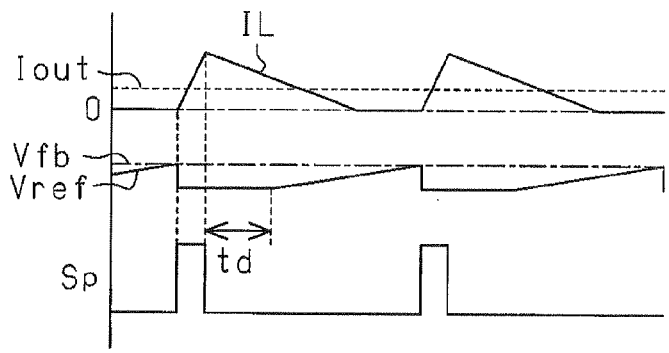

When the output current Iout flowing through the load 13 illustrated in FIG. 1 changes, the output voltage Vout varies in accordance with the output current Iout. The feedback voltage Vfb changes in accordance with the change in the output voltage Vout. As described above, the change in the feedback voltage Vfb results in adjustment of the delay time td so that the feedback voltage Vfb conforms to the base voltage Vr1. In other words, the delay time td is shortened as illustrated in FIG. 3(a) when the load 13 applies a heavy load, and the delay time td is lengthened as illustrated in FIG. 3(b) when the load 13 applies a light load. In this manner, when a change in the load 13 changes the output current Iout, the delay time td is adjusted so that the inactive time is in accordance with the changed output current Iout. This stabilizes the feedback voltage Vfb, or the output voltage Vout, regardless of the state of the load 13.

The DC-DC converter of the present embodiment includes the comparator 21, which compares the feedback voltage Vfb and the reference voltage Vref, and activates the switch circuit SW1 in accordance with the comparison result. Further, the DC-DC converter delays the increasing commencement timing of the reference voltage Vref from the timing at which the switch circuit SW1 is inactivated by a controlled delay time td. The adjustment of the delay time td in accordance with the feedback voltage Vfb outputs a stable output voltage Vout regardless of a change in the load 13. In this manner, the DC-DC converter of the present embodiment improves the regulation of the output voltage Vout relative to a change in the load 13.

The foregoing description discusses the operation for stabilizing the output voltage Vout relative to a change in the load. However, when there is a factor that changes the output voltage, such as a change in the input voltage Vin, the output voltage Vout may be stabilized in the same manner.

For example, a DC-DC converter such as that described above outputs the output voltage Vout, which is set by the input voltage Vin and the on duty of the switch circuit SW1. The DC-DC converter of the present embodiment adjusts the delay time td so that the feedback voltage Vfb, which changes in accordance with the output voltage Vout, conforms to the first base voltage Vr1. Accordingly, even when the input voltage Vin changes, a stable output voltage Vout is output.

Figure 4A:
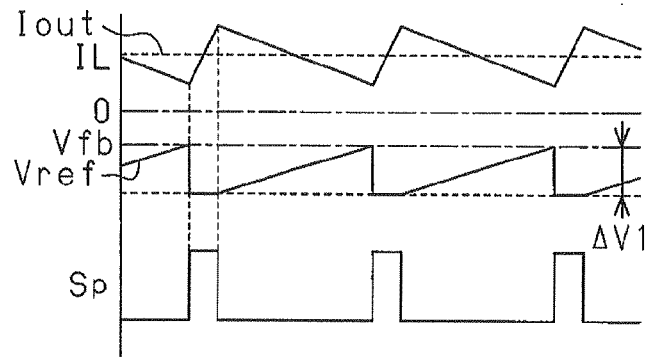
FIGS. 4(a) and 4(b) are waveform diagrams illustrating the operation of a comparative example.
Figure 4B:
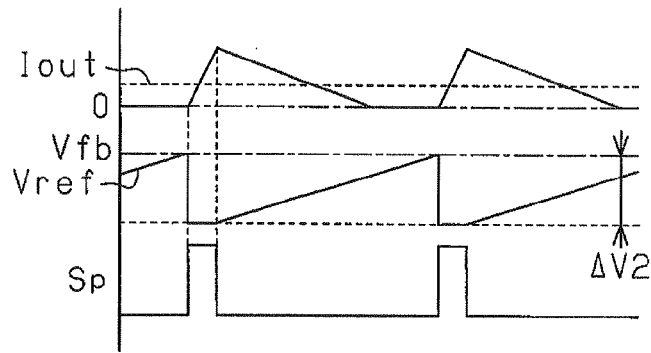

In a DC-DC converter that commences to increase the reference voltage at a timing in which a switch circuit is inactivated, the voltage at which the reference voltage commences to increase may be adjusted to stabilize the voltage at which the feedback voltage conforms to the reference voltage, that is, to stabilize the output voltage. FIGS. 4(a) and 4(b) illustrate the operational waveform of such a DC-DC converter. The reference characters used in FIG. 4 are in correspondence with the other drawings to facilitate comparison with the DC-DC converter of the present embodiment.

An offset voltage for the base voltage Vr2 may be adjusted so that in comparison with a voltage difference $\Delta V1$ of the feedback voltage Vfb and the base voltage Vr2 in a heavy load state illustrated in FIG. 4(a), a voltage difference $\Delta V2$ is greater in a light load state as illustrated in FIG. 4(a). A DC-DC converter that realizes such a scheme stabilizes the feedback voltage Vfb, or the output voltage Vout.

However, with respect to such a DC-DC converter, the DC-DC converter readily responds to sudden changes in the load (for example, a sudden increase in the load current).

Figure 5:
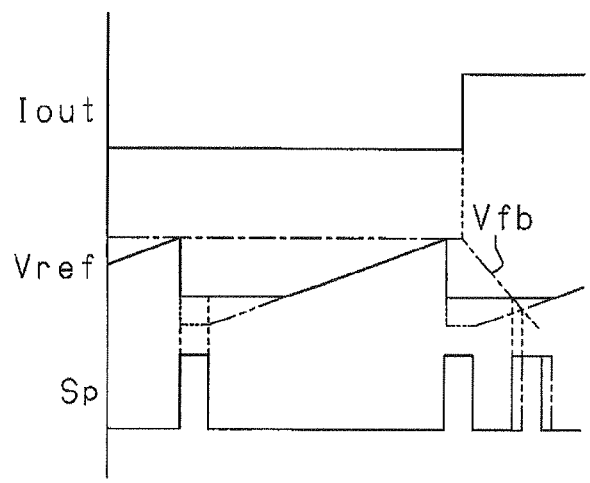
FIG. 5 is a waveform diagram illustrating the operation of the DC-DC converter according to the first embodiment.

For example, as illustrated in FIG. 5, when the load current (output current Iout) suddenly increases, the feedback voltage Vfb decreases accordingly. The DC-DC converter of the present embodiment sets the second base voltage Vr2 so that the potential difference from the first base voltage Vr1 is sufficient for increasing the reference voltage Vref at a given inclination. Then, the reference voltage Vref (illustrated by solid line in FIG. 5), which is equal to the base voltage Vr2, is continuously output. In contrast, in the scheme that offsets the increasing commencement voltage, the reference voltage Vref (illustrated by double-dashed line in FIG. 5) may commence increasing from a voltage that is lower than the base voltage Vr2 of the present embodiment. In the DC-DC converter of the present embodiment, the time period from when the output current Iout changes to when the drive signal Sp (solid line) is output at a high level is shorter than that of the offsetting scheme (double-dashed line). In other words, the response time with respect to a change in the load is short. Accordingly, the DC-DC converter of the present embodiment is applicable to sudden changes in the load.

In the scheme that offsets the increasing commencement voltage for the reference voltage Vref, the setting of the base voltage may limit the adjustment range of the offset voltage. For example, when the power supply voltage for the low potential side is 0 V (zero volts), it is difficult to set the increasing commencement voltage as a negative voltage. This limits the inactive period.

In contrast, the DC-DC converter of the present embodiment adjusts the delay time td. Thus, a long inactive period may be set by lengthening the delay time td, that is, by decreasing the amount of current I13 supplied to the capacitor C11 illustrated in FIG. 2. To change the current I13, for example, the mirror ratio of the mirror circuit including the transistors T12 and T13 may be adjusted, that is, the characteristics (current ratio, size ratio, and the like) of the transistor T12 and the transistor T13 may be adjusted.

The present embodiment has the advantages described below.

(1) The reference voltage generation circuit 22 generates the reference voltage Vref that includes the ramp voltage portion by adding a ramp voltage, which is in accordance with the charged amount of the capacitor C2, to the base voltage Vr2. The timing adjustment circuit 24 generates the control signal Sd that is delayed from the drive signal Sp, which drives the switch circuit SW1. Further, the timing adjustment circuit 24 adjusts the delay time td of the control signal Sd that controls the switch circuit SW2, which is coupled in parallel to the capacitor C2, in accordance with the feedback voltage Vfb. This delays the charging commencement timing of the capacitor C2 from the inactivation timing of the switch circuit SW1 and adjusts the delay time td. Thus, the timing at which the reference voltage Vref changes when the feedback voltage Vfb changes is adjusted, and the feedback voltage Vfb is stabilized. Accordingly, the output voltage Vout is prevented from being changed when the state of the load 13 changes, and the output voltage Vout is stabilized.

(2) The timing adjustment circuit 24 compares the feedback voltage Vfb and the base voltage Vr1 to adjust the delay time td in accordance with the comparison result. Accordingly, changes in the feedback voltage Vfb are suppressed, and the output voltage Vout is stabilized.

(3) The timing adjustment circuit 24 adjusts the delay time td so that the feedback voltage Vfb and the base voltage Vr1 conform to each other. The feedback voltage Vfb is generated by dividing the output voltage Vout with the resistors R1 and R2. Since the feedback voltage Vfb conforms to the base voltage Vr1, the output voltage Vout is stabilized at a voltage that is in accordance with the base voltage Vr1. This facilitates the setting of the target voltage for the output voltage Vout.

(4) The timing adjustment circuit 24 adjusts the changing commencement timing of the reference voltage Vref. The timing adjustment circuit 24 adjusts the timing for adding a ramp voltage to the base voltage Vr2 in order to generate the ramp voltage portion in the reference voltage Vref. The base voltage Vr2 is a fixed value, the inclination of the ramp voltage is fixed, and there are no requirements for changing the base voltage Vr2 or the inclination of the ramp voltage when generating the reference voltage Vref. In other words, there is no need for a circuit element that generates and adds an offset voltage. Since voltage errors that would result in variations or the like of such additional circuit elements do not occur, voltage displacement is prevented. That is, the output voltage Vout is stabilized.

(5) The control circuit 12 stabilizes the feedback voltage Vfb, that is, the output voltage Vout. Since the capacitor C1 does not have to be applicable to an output voltage that includes a relatively large ripple component, the capacitor C1 may be a capacitor for which equivalent series resistance (ESR) has a small resistance (e.g., superimposed ceramic capacitor). This allows for reduction in the size and cost of the DC-DC converter.

Second Embodiment

A power regulator, or DC-DC converter, according to a second embodiment will now be discussed with reference to FIG. 1. To avoid redundancy, like or same reference numerals are given to those components that are the same as the corresponding components of the first embodiment. Such components will not be described in detail.

Figure 6:
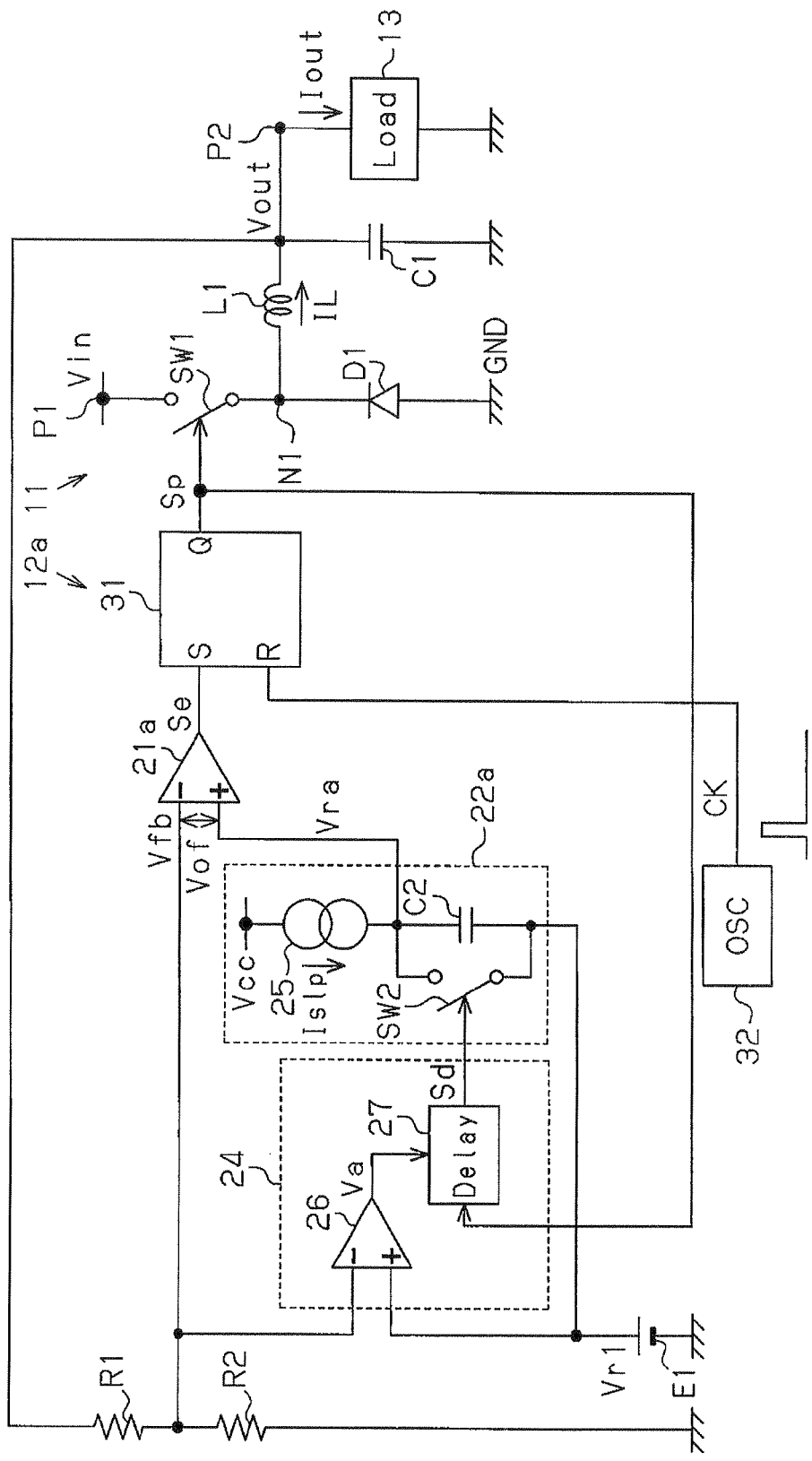
FIG. 6 is a block circuit diagram of a DC-DC converter according to a second embodiment.

As illustrated in FIG. 6, the DC-DC converter of the present embodiment includes a control circuit 12a, which controls the converter unit 11.

The control circuit 12a includes a comparator 21a, a reference voltage generation circuit 22a, the timing adjustment circuit 24, the base power supply E1, the resistors R1 and R2, an RS type flip-flop circuit (RS-FF circuit) 31, and an oscillator 32.

The comparator 21a has an inverting input terminal, which is supplied with a feedback voltage Vfb, and a non-inverting input terminal, which is supplied with a reference voltage Vra output from the reference voltage generation circuit 22a.

The first terminal of the constant current source 25 is coupled to the power line for the high potential voltage Vcc. The second terminal of the constant current source 25 is coupled to the first terminal of the capacitor C2. The second terminal of the capacitor C2 is coupled to the positive terminal of the base power supply E1. The capacitor C2 is coupled in parallel to the switch SW2. Accordingly, the reference voltage generation circuit 22a adds the charged voltage of the capacitor C2 to the base voltage Vr1 and generates the reference voltage Vra. The switch circuit SW2 and the capacitor C2 are one example of a voltage adding circuit that adds a ramp voltage to the base voltage Vr1.

The comparator 21a generates the comparison result signal Se in accordance with the comparison result of the feedback voltage Vfb and the reference voltage Vra. The comparator 21a has an offset voltage Vof between its two input terminals. The comparator 21a compares a voltage Vofa, which is lower than the reference voltage Vra by an amount corresponding to the offset voltage Vof, outputs the comparison result signal Se at a low level when the feedback voltage Vfb is higher than the voltage Vofa, and outputs the comparison result signal Se at a high level when the feedback voltage Vfb is lower than the voltage Vofa. In other words, the offset voltage Vof of the comparator 21a corresponds to the voltage difference of the first and second base voltages Vr1 and Vr2 in the first embodiment. By using the offset voltage Vof of the comparator 21a in this manner, the base power supplies may be reduced in number. In other words, the offset voltage Vof does not need to be canceled for the comparator 21a. This accordingly reduces the circuit scale.

The oscillator 32 outputs a clock signal CK having a given cycle. The cycle of the clock signal CK corresponds to the switching cycle of the DC-DC converter. For example, the oscillator 32 outputs the clock signal CK with a small pulse width at a cycle that is equal to the switching cycle.

The RS-FF circuit 31 has a reset terminal, which receives the comparison result signal Se from the comparator 21a, and a set terminal, which receives the clock signal CK from the oscillator 32. The RS-FF circuit 31 outputs the drive signal Sp at a high level when the comparator 21a outputs the comparison result signal Se at a high level. Further, the RS-FF circuit 31 outputs from its terminal Q the drive signal Sp at a low level when the clock signal CD has a high level. Accordingly, the RS-FF circuit 31 outputs the drive signal Sp at a high level during the period from when the comparison result signal Se rises to when the clock signal CK rises.

In the above-described DC-DC converter, the drive signal Sp falls at a fixed cycle due to the clock signal CK generated by the oscillator 32. Accordingly, the switching cycle is a fixed cycle.

In the same manner as the first embodiment, the DC-DC converter of the present embodiment delays the increasing commencement timing, at which the reference voltage Vra is increased from the base voltage Vr1, from the inactivation timing of the switch circuit SW1 during the period from when the drive signal Sp falls, that is, from when the switch circuit SW1 is inactivated, to when the switch circuit SW1 is activated next. Further, the delay time td until when the reference voltage Vra commences increasing is adjusted in accordance with the feedback voltage Vfb.

The present embodiment has the advantages described below.

(1) The clock signal CK resets the drive signal Sp, which drives the switch circuit SW1, so that the switch circuit SW1 undergoes switching at a fixed cycle. The stabilization of the switching cycle allows for switching noise of the switch circuit SW1 to be easily coped with (noise elimination).

(2) The reference voltage generation circuit adds a ramp voltage to the base voltage Vr1, which is compared with the feedback voltage Vfb. This allows for the base power supplies to be reduced in number and prevents the circuit scale from increasing.

It should be apparent to those skilled in the art that the embodiments may be embodied in many other specific forms without departing from the spirit or scope of the invention. Particularly, it should be understood that the present invention may be embodied in the following forms.

In the above-discussed embodiments, the inclinations of the reference voltages Vref and Vra may be changed. For example, the inclination may be changed in accordance with the input voltage Vin, the voltage difference of the input voltage Vin and output voltage Vout, and the like. That is, the current I13 of FIG. 2 may be changed.

In the above-discussed embodiments, a ramp voltage is added to the base voltage to generate the reference voltage. Instead, the ramp voltage may be added to the feedback voltage Vfb.

In the above-discussed embodiments, the reference voltage generation circuits 22 and 22a superimpose a ramp voltage with the capacitor C2 to the base voltages Vr2 and Vr1.

In each of the above-discussed embodiments, an N-channel MOS transistor is used as one example of a switch circuit included in the converter unit. However, a P-channel MOS transistor, for example, may be used instead. Further, a bipolar transistor may be used as the switch circuit. Alternatively, the switch circuit may be formed by a plurality of switches.

In the above-discussed embodiments, a switch circuit may be used in lieu of the diode D1, and the switch circuit may be controlled to be activated and inactivated in a complementary manner. Further, the switch circuit may prevent current from flowing in a reverse direction. Prevention of a reverse current flow may be realized by, for example, inactivating the switch circuit when detecting current that flows from the coil L1 to the switch circuit, inactivating the switch circuit when detecting a decrease in the current that flows from the switch circuit to the coil L1, and so on.

In each of the above-discussed embodiments, the feedback voltage Vfb is generated by dividing the output voltage Vout with the resistors R1 and R2. However, the generation of the feedback voltage Vfb is not limited in such a manner. For example, the feedback voltage Vfb may be the output voltage Vout.

In each of the above-discussed embodiments, at least one of the switch circuit SW1 and the diode D1 may be included in the control circuit 12 or 12a. Further, the converter unit 11 may be included in the control circuit 12 or 12a.

In each of the above-discussed embodiments, the base power supplies E1 and E2 respectively supply the base voltages Vr1 and Vr2. Instead, at least one of the base voltages Vr1 and Vr2 may be supplied from an external device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A power regulator, comprising:
an output terminal that outputs an output voltage;
a converter unit including a switch circuit, which is supplied with an input voltage, and a coil, which is coupled between the switch circuit and the output terminal; and
a control circuit that compares a feedback voltage, which is in accordance with the output voltage, and a reference voltage and controls the switch circuit in response to a switching timing that is in accordance with the comparison result, the control circuit comprising:
a voltage adding circuit that adds a ramp voltage to the feedback voltage or the reference voltage; and
a timing adjustment circuit coupled to the voltage adding circuit to delay a timing for adding the ramp voltage with the voltage adding circuit from a switching timing of the switch circuit, wherein the timing adjustment circuit adjusts a delay time of the timing for adding the ramp voltage from the switching timing in accordance with a difference of a base voltage, which is set in accordance with the output voltage, and the feedback voltage so that the feedback voltage conforms to the base voltage.

2. The power regulator according to claim 1, wherein:
the switch circuit is driven in response to a drive signal provided from the control circuit; and
the timing adjustment circuit includes:
  an operational amplifier that receives the feedback voltage and the base voltage to output an output signal; and
  a delay circuit that receives the output signal of the operational amplifier and the drive signal, generates a control signal for delaying the drive signal in accordance with the output signal of the operational amplifier, and provides the control signal to the voltage adding circuit.

3. The power regulator according to claim 2, wherein the delay circuit includes:
  a capacitor supplied with current that is in accordance with the output signal of the operational amplifier; and
  a switch circuit coupled in parallel to the capacitor and activated and inactivated by the drive signal;
  wherein the delay circuit generates the control signal in accordance with a charge state of the capacitor.

4. The power regulator according to claim 1, wherein:
the switch circuit is driven in response to a drive signal provided from the control circuit;
the timing adjustment circuit:
  outputs a first level control signal at a first timing based on the drive signal that activates the switch circuit;
  outputs a second level control signal at a time point in which a delay time elapses from a second timing at which the switch circuit is inactivated; and
  adjusts the delay time in accordance with the difference of the base voltage, which is set in accordance with the output voltage, and the feedback voltage;
the voltage adding circuit outputs the reference voltage at a fixed level in response to the first level control signal and changes the reference voltage at a given inclination in response to the second level control signal.

5. The power regulator according to claim 1, wherein the switching timing is an inactivation timing of the switch circuit.

6. The power regulator according to claim 1, wherein:
the reference voltage includes a ramp voltage portion, which corresponds to a period during which the ramp voltage is added, and a fixed voltage portion, which is exclusive of the ramp voltage portion;
the switch circuit is activated when provided with an activation level drive signal from the control circuit and inactivated when provided with an inactivation level drive signal from the control circuit;
the timing adjustment circuit provides, in response to the activation level drive signal, the voltage adding circuit with a control signal of a level for switching the reference voltage from the ramp voltage portion to the fixed voltage portion; and
the timing adjustment circuit provides, when a delay time that is in accordance with the feedback voltage elapses from the time point in which the timing adjustment circuit receives the inactivation level drive signal, the voltage adding circuit with a control signal of a level for switching the reference voltage from the fixed voltage portion to the ramp voltage portion.

7. The power regulator according to claim 6, wherein the voltage adding circuit changes a duration period of the fixed voltage portion in the reference voltage in accordance with the control signal of the timing adjustment circuit, and the voltage adding circuit maintains a fixed duration period for the ramp voltage portion of the reference voltage.

8. A control circuit for installation in a power regulator, the control circuit comprising:
  a voltage adding circuit that adds a ramp voltage to a feedback voltage of the power regulator or a reference voltage; and
  a timing adjustment circuit coupled to the voltage adding circuit to delay a timing for adding the ramp voltage with the voltage adding circuit from a switching timing of a switch circuit supplied with an input voltage in response to the switching timing, the switching timing being in accordance with a comparison result of the feedback voltage and the reference voltage, wherein the timing adjustment circuit adjusts a delay time of the timing for adding the ramp voltage from the switching timing in accordance with a difference of a base voltage, which is set in accordance with the output voltage, and the feedback voltage so that the feedback voltage conforms to the base voltage.

9. The control circuit according to claim 8, wherein the switching timing is an inactivation timing of the switch circuit.

10. A method for controlling a power regulator, the method comprising:
  switching a switch circuit supplied with an input voltage in response to a timing that is in accordance with a comparison result of a feedback voltage, which is in accordance with an output voltage, and a reference voltage;
  delaying a timing for adding a ramp voltage to the feedback voltage or the reference voltage from the switching timing of the switch circuit; and
  adjusting a delay time of the timing for adding the ramp voltage from the switching timing in accordance with a difference of a base voltage, which is set in accordance with the output voltage, and the feedback voltage so that the feedback voltage conforms to the base voltage.

* * * * *